United States Patent [19]

Richard

[11] Patent Number: 4,654,710
[45] Date of Patent: Mar. 31, 1987

[54] CONTRAST AMPLIFIER FOR VIDEO IMAGES

[75] Inventor: Christian J. Richard, Noyal Sur Vilaine, France

[73] Assignee: Thomson CSF, Paris, France

[21] Appl. No.: 815,932

[22] Filed: Jan. 3, 1986

[30] Foreign Application Priority Data

Apr. 1, 1985 [FR] France .................................. 85 00105

[51] Int. Cl.[4] .............................................. H04N 5/57
[52] U.S. Cl. ...................................... 358/169; 358/39; 358/160; 364/734
[58] Field of Search ................... 358/169, 39, 160, 32, 358/164, 184, 166, 139; 364/734, 715

[56] References Cited

U.S. PATENT DOCUMENTS

| | | | |
|---|---|---|---|
| 3,638,001 | 1/1972 | Gordon | 364/734 X |
| 4,231,065 | 10/1980 | Fitch et al. | 358/166 |
| 4,553,619 | 11/1985 | Fujinaga | 364/734 X |
| 4,603,353 | 7/1986 | Henson | 358/39 X |
| 4,606,009 | 8/1986 | Wiesmann | 364/734 X |

Primary Examiner—Michael A. Masinick
Assistant Examiner—E. Anne Toth
Attorney, Agent, or Firm—Cushman, Darby & Cushman

[57] ABSTRACT

A contrast amplifier for video images comprises means for computing a mean value $M_g$ of luminance of all the points of a field, means consisting of a horizontal filter and a vertical filter for computing a local mean value $M_v$ of luminance in the vicinity of a point being processed and means for multiplying the value of luminance of the point during processing by a variable coefficient which is proportional to the ratio $M_v/M_g$.

3 Claims, 1 Drawing Figure

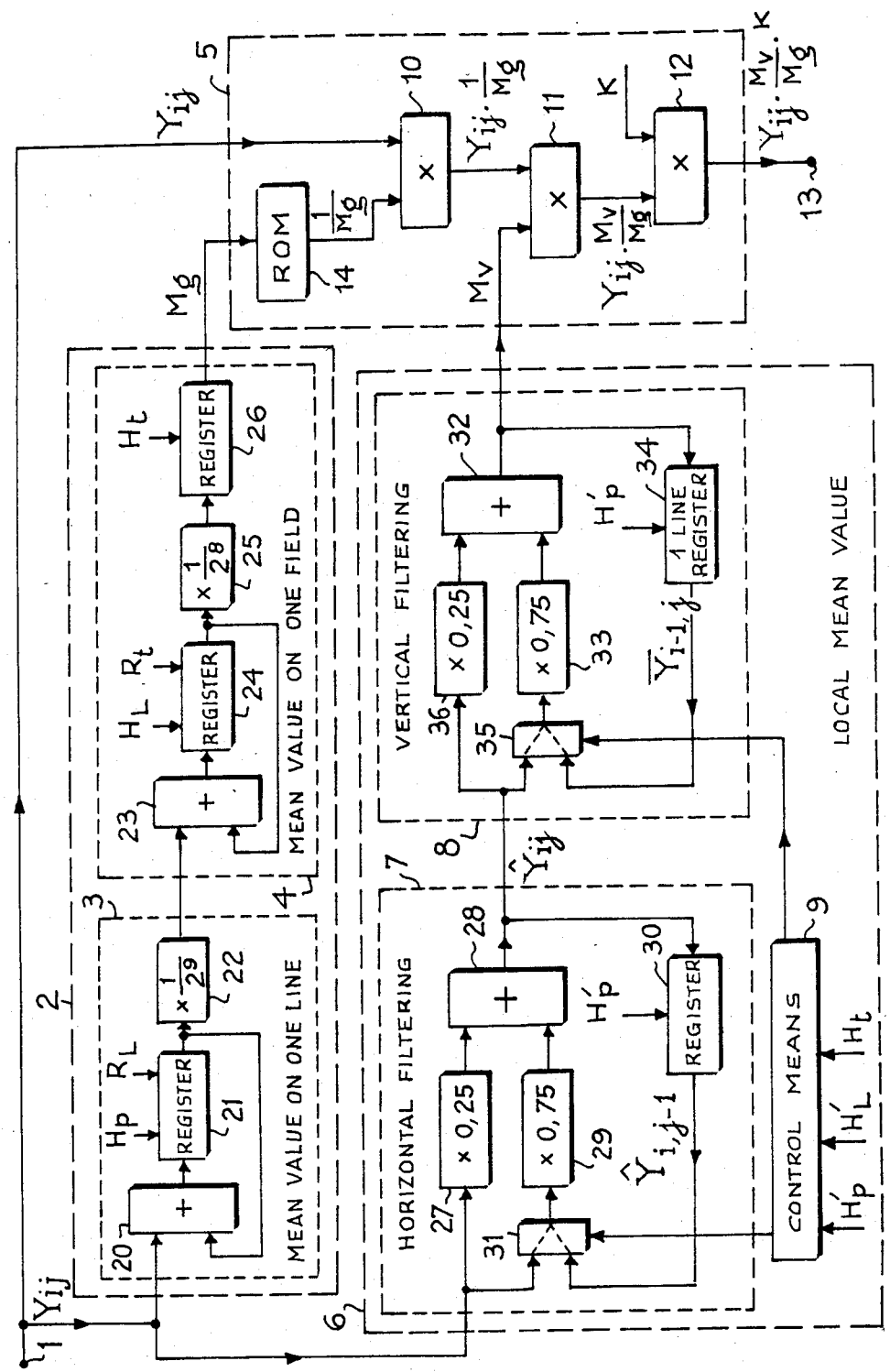

CONTRAST AMPLIFIER FOR VIDEO IMAGES

BACKGROUND OF THE INVENTION

1. Field of the Invention

The present invention relates to devices which are known as contrast amplifiers and are employed for improving the visual perception of video images when these images have low contrast for such reasons as insufficient illumination, for example.

2. Description of the Prior Art

It is a known practice to enhance or amplify the contrast of video images by increasing the gain of the channel used for transmitting the luminance signal representing these images. This increase in gain is either uniform for all values of luminance or variable as a function of the luminance value. The disadvantage of this method is that it also increases the contrast of noise interference. Interference of this type becomes more troublesome as the contrast amplification is greater.

Another known method consists in equalizing the distribution of luminance values of each field throughout the range of possible values. To this end, the distribution of luminance values of a field is determined and each luminance value of the following field is corrected as a function of the distribution which is found in the case of the luminance values of the preceding field. French patent Application No. 2,456,448 filed by the present Applicant describes a method of this type. This known method has the advantage of putting the scale of luminance values to the best possible use but has the effect of increasing noise interference and is complex to apply in practice.

The contrast amplifier in accordance with the invention does not have the disadvantage of enhancing noise interference and is at the same time simple to construct. It is therefore particularly advantageous for processing images which are highly affected by noise. The amplifier makes advantageous use of the fact that noise affects only isolated points or a small number of interrelated points. The amplifier in accordance with the invention does not amplify the visibility of these points since it controls the gain of the channel which transmits the luminance signal, in a different manner at each image point, as a function of the luminance in the vicinity of this point and of the luminance of the entire image. The luminance in the vicinity of each point is determined by means of a so-called bidirectional spatial filtering process which consists of two recursive digital filtering operations performed successively. The mean luminance of an image can be estimated by considering the mean luminance of the preceding image in the case of a sequence of video images.

SUMMARY OF THE INVENTION

In accordance with the invention, a contrast amplifier for video images, each video image being represented by a sequence of digital values of luminance of the points of said image, comprises:

means for estimating a mean value $M_g$ of luminance of all the points of each image in succession;
means for computing a local mean value $M_v$ of luminance in the vicinity of a point being processed;
means for multiplying the value of luminance of the point being processed, by a variable coefficient which is proportional to the ratio $M_v/M_g$, the value thus obtained being such as to constitute the value of luminance of a point having enhanced contrast.

BRIEF DESCRIPTION OF THE DRAWINGS

Other features of the invention will be more apparent upon consideration of the following description and accompanying drawings in which the single FIGURE is a block diagram of an embodiment of the contrast amplifier according to the invention, processing a sequence of conventional video images. Each video image is composed of two interlaced fields which are processed as two independent images.

DESCRIPTION OF A PREFERRED EMBODIMENT

The embodiment considered by way of example comprises an input terminal 1, means 2 for computing a mean value $M_g$ of luminance of all the points of a field, means 6 for computing a local mean value $M_v$ of luminance of points which are adjacent to a point being processed for contrast enhancement, means 5 for multiplying the value of luminance of said point by a variable coefficient which is proportional to the ratio $M_v/M_g$ and an output terminal 13 for delivering a sequence of numerical values of luminance having enhanced contrast.

The input terminal 1 receives a sequence of numerical values $Y_{ij}$ of luminance of the points of a field and transmits them to an input of the means 2, to an input of the means 6 and to a first input of the means 5. The means 2 has an output connected to a second input of the means 5 for delivering the mean value $M_g$ to said means 5. The means 6 have an output connected to a third input of the means 5 for delivering the mean value $M_v$ to these latter.

The means 2 are constituted by a first computing device 3 for computing a mean value of luminance on each line and by a second computing device 4 for computing a mean value of luminance on a field by computing the average of the values supplied by the first device 3 during one field. The computing device 3 has an input which constitutes the input of the means 2 and has an output connected to an input of the second computing device 4. An output of the second computing device 4 constitutes the output of the means 2.

The first computing device 3 comprises an adder 20, a single-stage register 21 and a device 22 for dividing by $2^9$. The input of the device 3 is connected to a first input of the adder 20. An output of the adder 20 is connected to a data input of the register 21. An output of the register 21 is connected to a second input of the adder 20 and to an input of the device 22. The adder 20 and the register 21 constitute an accumulator. The register 21 receives a clock signal $H_p$ at the point-scanning frequency and receives a zero-reset signal $R_L$ at the line-scanning frequency. The device 22 for dividing by $2^9$ is constituted by special wiring for shifting the bits delivered by the register 21 by nine positions. These shifted bits are transmitted to the input of the second computing device 4.

The second computing device 4 comprises an adder 23, a single-stage register 24, a device 25 for dividing by $2^8$ and a single-stage register 26. The input of the computing device 4 is connected to a first input of the adder 23. An output of the adder 23 is connected to a data input of the register 24. An output of the register 24 is connected to a second input of the adder 23 and to an input of the device 25. An output of the device 25 is connected to a data input of the register 26 and an output of this latter constitutes the output of the device 4 and the output of the means 2.

The adder 23 and the register 24 constitute an accumulator. The register 24 receives a clock signal $H_L$ at the line frequency and receives a zero-reset signal $R_t$ at the field frequency. The device 25 for dividing by $2^8$ is constituted by a special wiring which has the effect of shifting the bits delivered by the register 24 by eight positions before transmitting them to the input of the register 26. The register 26 has a clock input for receiving a clock signal $H_t$ at the field frequency in order to store a mean value of luminance during an entire field period. The mean luminance value $M_g$ computed during a field period is employed for amplifying (enhancing) the contrast during the following field period.

The means 6 for computing a local mean value $M_v$ of luminance in the vicinity of a point being processed are constituted by a horizontal-filtering device 7 connected in series with a vertical-filtering device 8 and by control means 9 for initialization. The filtering devices 7 and 8 are recursive digital filtering devices. The so-called bidirectional spatial filtering achieved by a combination of these devices is comparable with the filtering which would be obtained by computing the arithmetical mean of the luminance values in a sliding "window" centered on the current point. The advantage of this combination, however, lies in the fact that it is conducive to greater simplicity of computations since the horizontal filtering and vertical filtering operations mentioned above are performed by means of two recursive computations which require a smaller number of calculations and less storage of values.

Computation of a mean value of luminance for each line is performed on 512 points, that is to say on a number of points slightly smaller than the number of real points in a line. The number 512 makes it possible to simplify the device 3 since it is very easy to perform a division by $2^9$. Computation of the mean value of luminance of the points of a field is carried out on 256 lines, which is smaller than the real number of lines in a field according to European standards since it is an easy matter to perform a division by $2^8$. The signal generators for delivering the clock signals $H_t$, $R_L$, $R_t$, $H_t$ are not shown in the FIGURE since their construction is within the capacity of any one versed in the art. The clock signal $H_p$ delivers only 512 pulses per line and the clock signal $H_L$ delivers only 256 pulses per field.

The horizontal filtering device 7 computes, in respect of the $j^{th}$ point on the $i^{th}$ line, a horizontally-filtered luminance value $\hat{Y}_{ij}$ in accordance with the formula:

$$\hat{Y}_{ij} = 0.25 \cdot Y_{ij} + 0.75 \cdot \hat{Y}_{i,j-1}$$

where $\hat{Y}_{i,j-1}$ is a value filtered by the filtering device 7 and computed in respect of the immediately preceding point.

Said device 7 comprises a device 27 for multiplication by 0.25, a device 29 for multiplication by 0.75, an adder 28, a single-stage register 30 and a multiplexer 31. The multiplication devices 27 and 29 are constituted by read-only memories (ROMs). The input of the means 6 is connected to an input of the device 7 and this latter is connected to an input of the device 27 for multiplication by 0.25 and to a first input of the multiplexer 31. A second input of the multiplexer 31 is connected to an output of the register 30 and an output of the multiplexer 31 is connected to an input of the device 29 for multiplication by 0.75. A control input of the multiplexer 31 is connected to an output of the control means 9 for initialization.

An output of the device 27 is connected to a first input of the adder 28. An output of the adder 28 is connected to the output of the device 7 and to an input of the register 30. An output of the register 30 delivers the value $\hat{Y}_{i,j-1}$ to the second input of the multiplexer 31. An output of the device 29 is connected to a second input of the adder 28. The register 30 has a clock input for receiving a clock signal $H'_p$ at the point-scanning frequency and the number of pulses of which corresponds to the real number of points in each line. The generator for the clock signal $H'_p$ is not shown in the FIGURE and construction of this generator is within the capacity of those versed in the art.

The vertical-filtering device 8 has a structure which is similar to that of the horizontalfiltering device 7 but comprises a register 34 for producing a delay which corresponds to one line instead of the register 30 which produces a delay corresponding to one image point. The register 34 delivers a luminance value $\hat{Y}_{i-1,j}$ corresponding to the point equivalent to the point being processed and located on the immediately preceding line, this value being filtered by the devices 7 and 8. The device 8 comprises a device 36 for multiplication by 0.25, a device 33 for multiplication by 0.75, an adder 32, the register 34 and a multiplexer 35.

An input of the device 8 is connected to the output of the device 7 and is connected to an input of the device 36 for multiplication by 0.25 and to a first input of the multiplexer 35. A second input of the multiplexer 35 is connected to the output of the register 34. An output of the multiplexer 35 is connected to an input of the device 33 for multiplication by 0.75. A control input of the multiplexer 35 is connected to an output of the means 9.

An output of the device 36 is connected to a first input of the adder 32. The output of the adder 32 is connected to the output of the device 8, this output being such as to constitute the output of the means 6, and to an input of the register 34. The output of the register 34 delivers the value $\hat{Y}_{i-1,j}$ to the second input of the multiplexer 35. An output of the device 33 is connected to a second input of the adder 32. The register 34 has a control input for receiving the clock signal $H'_p$.

Since the horizontal-filtering device 7 and the vertical-filtering device 8 are connected in series, they perform a spatial filtering operation which produces a filtered value $M_v$. This value is similar to the mean value which would be obtained by computing the arithmetical mean of the luminance values of the points located in a sliding window centered on the point being processed. The recursive filtering operation carried out by the device 7 is not possible for the first point of each line and the vertical recursive filtering operation performed by the device 8 is not possible for the first line. It is for this reason that means 9 have been provided for initialization.

The means 9 receive the clock signals $H'_p$ and $H_t$ and a clock signal $H'_L$. The clock signal $H'_L$ delivers at the line-scanning frequency a number of pulses equal to the real number of lines of each field.

During the period which corresponds to processing of the first point of each line, the means 9 deliver a signal for controlling the multiplexer 31 in such a manner as to ensure that this latter connects the input of the device 29 to the input of the device 7. Thus the filtered value $\hat{Y}_{i,j-1}$ of luminance of the non-existent preceding point is replaced by the non-filtered value $Y_{ij}$ of luminance of the point being processed. The device 7 therefore computes: $0.25.Y_{ij}+0.75.Y_{ij}=Y_{ij}$. In the case of the first point of each line, the filtered value is therefore strictly identical with the original value. During each period corresponding to processing of the other points of each line, the means 9 deliver a signal for controlling the multiplexer 31 in such a manner as to ensure that this latter connects the input of the device 29 to the output of the register 30. The device 7 then computes a filtered value in accordance with the recurrence formula:

$$\hat{Y}_{ij}=0.25.Y_{ij}+0.75.\hat{Y}_{i,j-1}$$

During the period which corresponds to processing of all the points of the first line of each field, the means 9 deliver a signal for controlling the multiplexer 35 in such a manner as to ensure that this latter connects the input of the device 33 to the input of the device 8. Thus the filtered value $\overline{Y}_{i-1,j}$ of the point equivalent to the current point on the non-existent preceding line is replaced by the horizontally filtered value $\hat{Y}_{ij}$ of the current point. The device 8 therefore computes: $0.25.\hat{Y}_{ij}+0.75.\hat{Y}_{ij}=\hat{\hat{Y}}_{ij}$.

In the case of the points of the first line, spatial filtering is therefore reduced to horizontal filtering. During the time required to process the other lines of each field, the means 9 deliver a signal for controlling the multiplexer 35 in such a manner as to ensure that this latter connects the output of the register 34 to the input of the device 33. The device 8 then computes a filtered value in accordance with the recurrence formula:

$$\hat{\hat{Y}}_{ij}=0.25.\hat{Y}_{ij}+0.75.\hat{\hat{Y}}_{i-1,j}.$$

This filtered value $\overline{\overline{Y}}_{ij}$ constitutes the mean value $M_v$ of luminance in the vicinity of the point considered.

The means 5 for multiplying the value $Y_{ij}$ of luminance of the point being processed by a variable coefficient which is proportional to the ratio $M_v/M_g$ are constituted by a read-only memory (ROM) 14 and three digital multipliers 10, 11 and 12. An address input of the read-only memory 14 is connected to the second input of the means 5 for receiving the mean value $M_g$. An output of the memory 14 delivers a value $1/M_g$ to a first input of the multiplier 10. A second input of the multiplier 10 is connected to the first input of the means 5 for receiving a non-filtered luminance value $Y_{ij}$. An output of the multiplier 10 is connected to a first input of the multiplier 11 in order to deliver a value $Y_{ij}\cdot 1/M_g$ to this latter.

A second input of the multiplier 11 is connected to the third input of the means 5 for receiving the value $M_v$ of the local mean. An output of the multiplier 11 is connected to a first input of the multiplier 12 in order to deliver a value $Y_{ij}\cdot M_v/M_g$ to said first input. A second input of the multiplier 12 receives a constant value K which can be adjusted by an operator in order to adjust the contrast at will. An output of the multiplier 12 constitutes the output of the means 5 and is connected to the output terminal 13 of the contrast amplifier. Said output delivers a value $Y_{ij}\cdot M_v/M_g\cdot K$.

The coefficient $M_v/M_g$ can be lower than or higher than 1 according to whether the vicinity of the point considered has a mean luminance value which is lower than or higher than the mean luminance value of the preceding field. Depending on which of these two cases applies, the effect of the contrast amplifier is therefore to reduce the luminance of the current point in order to bring it close to the value of black or respectively to increase said luminance in order to bring it close to the value of pure white.

Granular noise is represented by isolated grey points which are particularly visible in dark areas. As a result of bidirectional spatial filtering, the luminance values affected by noise produce very little disturbance in computation of the local mean value $M_v$ and are consequently treated in the same manner as the values of the adjacent points. In the case of areas which are darker than the general mean value, these areas have an even darker appearance after processing including the points affected by noise. This is the contrary to what may be observed in the conventional method which consists simply in producing a uniform increase in gain in respect of all luminance values and therefore has the effect of increasing the luminosity of isolated grey points in the dark areas.

The invention is not limited to the example of construction described in the foregoing and many alternative embodiments are within the competence of those versed in the art. It is possible in particular to change the order of the horizontal filtering device 7 and of the vertical filtering device 8 or to change the order of the two multiplication operations which are necessary for computing $Y_{ij}\cdot M_v/M_g\cdot K$.

It is also possible to replace the means 6 by any other known device for computing a mean value of luminance in the vicinity of the point being processed.

The invention can be applied in particular to television pictures having low levels of illumination.

What is claimed is:

1. A contrast amplifier for video images, each video image being represented by the sequence of digital values of luminance of a points of said image, comprising:
    first means for estimating a mean value $M_g$ of luminance of all the points of each image in succession;
    second means for computing a local mean value $M_v$ of luminance in the vicinity of a point being processed;
    means for multiplying the value of luminance of the point being processed by a variable coefficient which is proportional to the ratio $M_v/M_g$, the value thus obtained being such as to constitute the value of luminance of a point having enhanced contrast.

2. A contrast amplifier according to claim 1, wherein the means for computing a local mean value $M_v$ of luminance in the vicinity of a point comprise:
    first recursive filtering means for receiving the sequence of luminance values X in order to compute a filtered value $\hat{X}$ in accordance with the formula:

$$\hat{X}=\alpha_1\cdot X+(1-\alpha_1)\cdot A \text{ with } 0\leq\alpha_1\leq 1$$

where A is a filtered luminance value which has previously been computed by the first means in respect of one of the two points which are immediately adjacent to the point considered, namely the point which precedes said point on the same line and the corresponding point on the line scanned immediately beforehand;
    and second recursive filtering means in series with the first means for computing the value $M_v$ in accordance with the formula:

$$M_v=\alpha_2\cdot\hat{X}+(1-\alpha_2)\cdot B \text{ with } 0\leq\alpha_2\leq 1$$

where B is a filtered luminance value which has previously been computed by the first and second means in respect of the other of the two points immediately adjacent to the point considered.

3. A contrast amplifier according to claim 2, wherein the means for estimating a mean value $M_g$ of luminance of all the points of each image comprise:
 a first device for computing a mean value of luminance of the points on each line of an image,
 a second device for computing a mean value of all the mean values computed by the first device in the case of each image.

* * * * *